Sept. 19, 1950 E. P. FAIRBAIRN ET AL 2,523,106

VARIABLE-FREQUENCY RADIO SIGNALING APPARATUS

Filed May 10, 1947 4 Sheets-Sheet 1

INVENTORS
ERIC PLAYFAIR FAIRBAIRN
ALEXANDER ALBERT CHUBB
BY
[signature]
ATTORNEY

VARIABLE-FREQUENCY RADIO SIGNALING APPARATUS

Filed May 10, 1947 4 Sheets-Sheet 2

INVENTORS
ERIC PLAYFAIR FAIRBAIRN
ALEXANDER ALBERT CHUBB
BY
[signature]
ATTORNEY

VARIABLE-FREQUENCY RADIO SIGNALING APPARATUS

Filed May 10, 1947 4 Sheets-Sheet 3

INVENTORS
ERIC PLAYFAIR FAIRBAIRN
ALEXANDER ALBERT CHUBB
BY
ATTORNEY

Sept. 19, 1950 E. P. FAIRBAIRN ET AL 2,523,106

VARIABLE-FREQUENCY RADIO SIGNALING APPARATUS

Filed May 10, 1947 4 Sheets-Sheet 4

INVENTORS
ERIC PLAYFAIR FAIRBAIRN
ALEXANDER ALBERT CHUBB
BY
[signature]
ATTORNEY Patented Sept. 19, 1950

2,523,106

UNITED STATES PATENT OFFICE 2,523,106

VARIABLE-FREQUENCY RADIO SIGNALING APPARATUS

Eric Playfair Fairbairn and Alexander Albert Chubb, Coventry, England, assignors to The General Electric Company, Limited, London, England Application May 10, 1947, Serial No. 747,218
In Great Britain October 31, 1945

Section 1, Public Law 690, August 8, 1946

Patent expires October 31, 1965

7 Claims. (Cl. 250—36)

Figure 1:
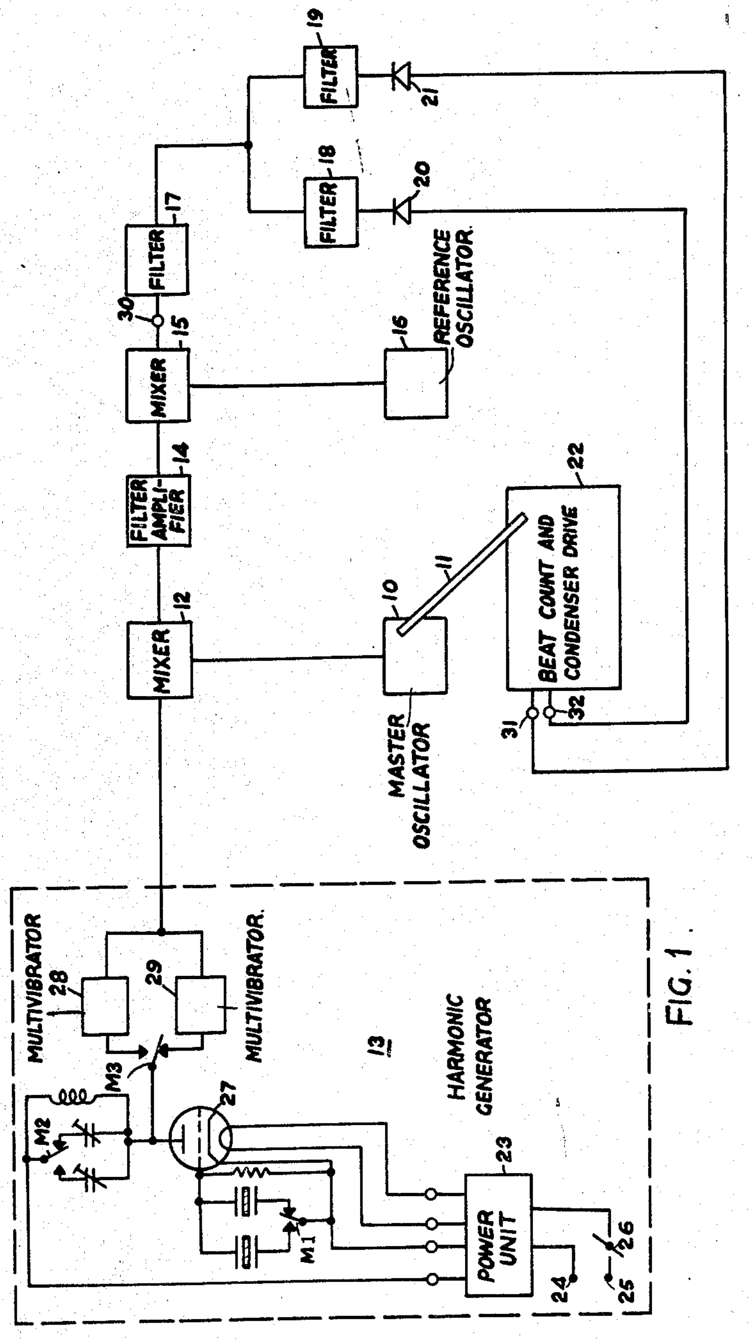

The present invention relates to variable-frequency radio signalling apparatus of the type in which a tuning element, such as a variable condenser, is provided by which the apparatus can be tuned to a desired frequency and in which the correct setting of the tuning element for such desired frequency is determined by counting, as the setting of the tuning element is changed, the coincidences produced by beating together a raster of harmonics and another frequency, the raster being composed of a variable frequency $f$ modulated by the harmonics of another frequency $h$ (usually crystal controlled) and the said other frequency being a reference frequency $f_0$ (also usually crystal controlled) or else the raster being composed of the frequency $f_0$ modulated by the harmonics of the frequency $h$ (both being usually crystal controlled) and the said other frequency being the variable frequency $f$. The coincidences referred to occur when beats between one of the raster frequencies and the said other frequency lie within a suitable narrow frequency band which may be selected by a suitable filter.

If the number of settings of the tuning element from which selection can be made is large, it may be inconvenient to count all the coincidences up to the desired setting, even if the counting be automatic. It is, therefore, usually desirable to provide means for generating two rasters, one composed of a series of major harmonics and the other of a series of minor harmonics, the former series including for example only every fifth minor harmonic. For instance if it be desired to count to the setting 32 from zero, 6 major harmonics (excluding zero) might be first counted to give a setting of 30, and two minor harmonics then counted to reach 32.

The means for generating the beating oscillations, as well as the amplifying means whereby the oscillations can be brought to a suitable amplitude for operating a counter or indicator, comprise thermionic valves. Consequently when apparatus of the type set forth is first switched on, some little time passes, whilst the cathodes of the valves are heating up, before the beating oscillations are being generated and amplified effectively. It is clearly important to ensure that tuning, whether by an electric motor or by hand, is not started until the said oscillations are being effectively generated as otherwise the counting will be inaccurate.

Known means for delaying the starting of the motor have been found unsatisfactory for various reasons. For instance a relay controlling the starting of the motor may be connected in the cathode circuit of one of the valves, the relay operating when the current therein reaches a predetermined value. However, it is difficult to ensure that the particular valve selected is the one requiring the longest time for heating its cathode and the relay may operate before certain of the valves are fully operative.

If a thermal relay is provided to introduce delay, it is necessary in order to cover contingencies to adjust it to give a delay time which is considerably in excess of the smallest delay time necessary. Moreover such relays are apt to be unreliable under vibration.

One object of the present invention is to provide apparatus of the type set forth in which the commencement of a tuning operation is delayed until said beating oscillations are being generated and have reached a predetermined amplitude, that is to say until all valves in the apparatus are fully operative.

Another object of the present invention is to provide apparatus of the type set forth in which a tuning operation is permitted to take place substantially immediately after all valves in the apparatus are fully operative and said beating oscillations are being produced and have reached a predetermined amplitude.

A further object of the invention is to provide apparatus of the type set forth in which a test for the presence at or above a predetermined amplitude of said beating oscillations is made every time a tuning process is initiated.

Figure 2A:
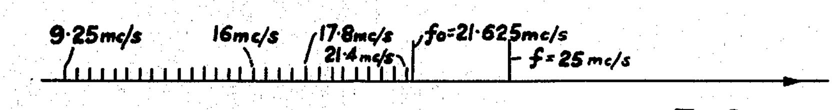
Figure 2B:
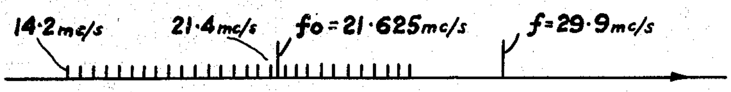
Figures 3, 6, 7, 8:
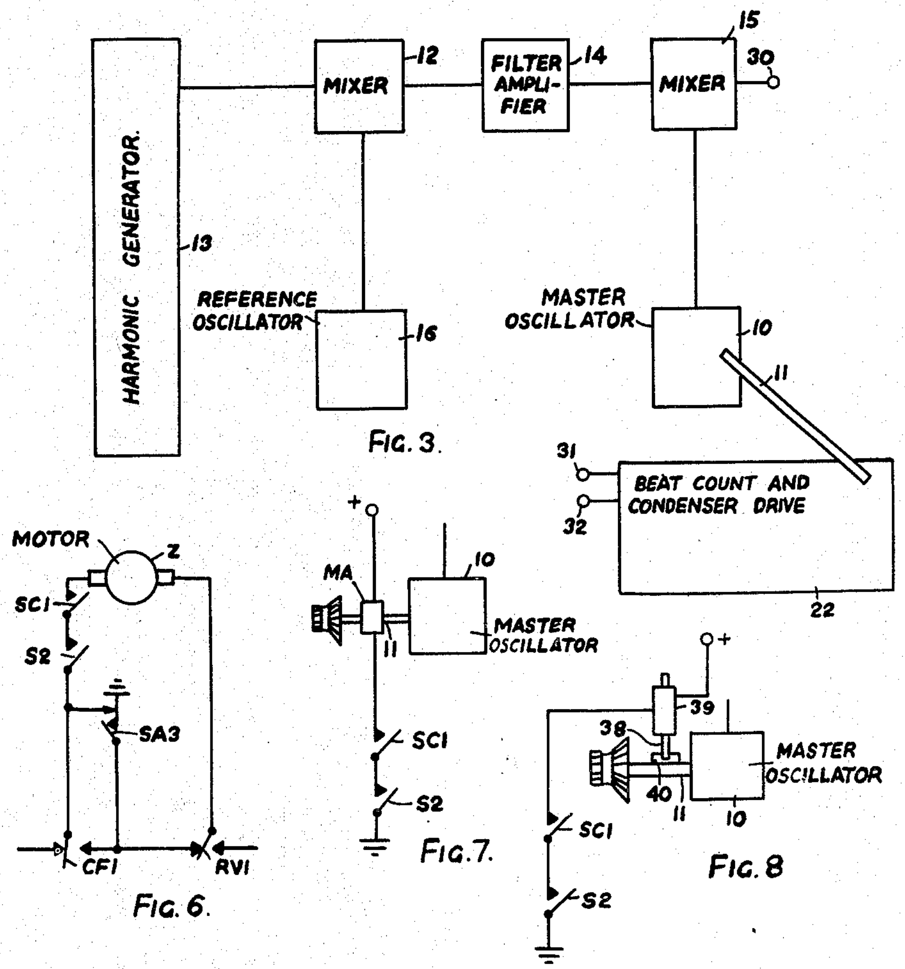
Figure 4:
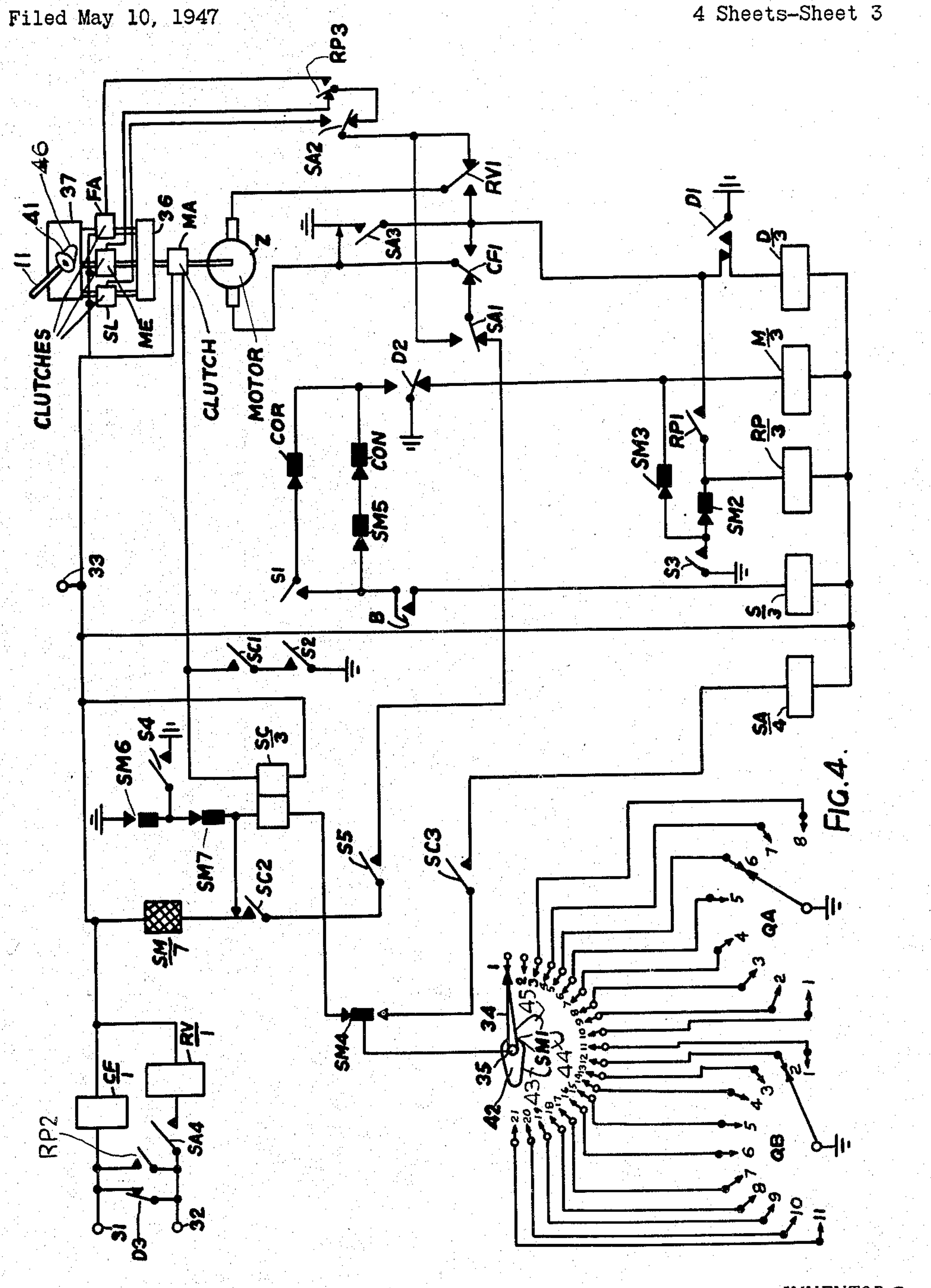

A brief description of one form of apparatus of the type set for for the purpose of assisting in the understanding of the present invention, and a description of two embodiments of the present invention and certain modifications thereof, will now be given by way of example only, with reference to the accompanying drawings, in which, Fig. 1 is a block schematic diagram of one form of apparatus of the type to which the present invention relates, Fig. 2$a$ is a diagram illustrating a raster of harmonics relative to a reference frequency, Fig. 2$b$ is a diagram similar to Fig. 2$a$, but showing a raster in a different position with respect to said reference frequency, Fig. 3 shows an alternative arrangement of part of Fig. 1, Fig. 4 is a circuit diagram of a beat-counting and condenser-driving circuit which includes one embodiment of the present invention.

Figure 5:
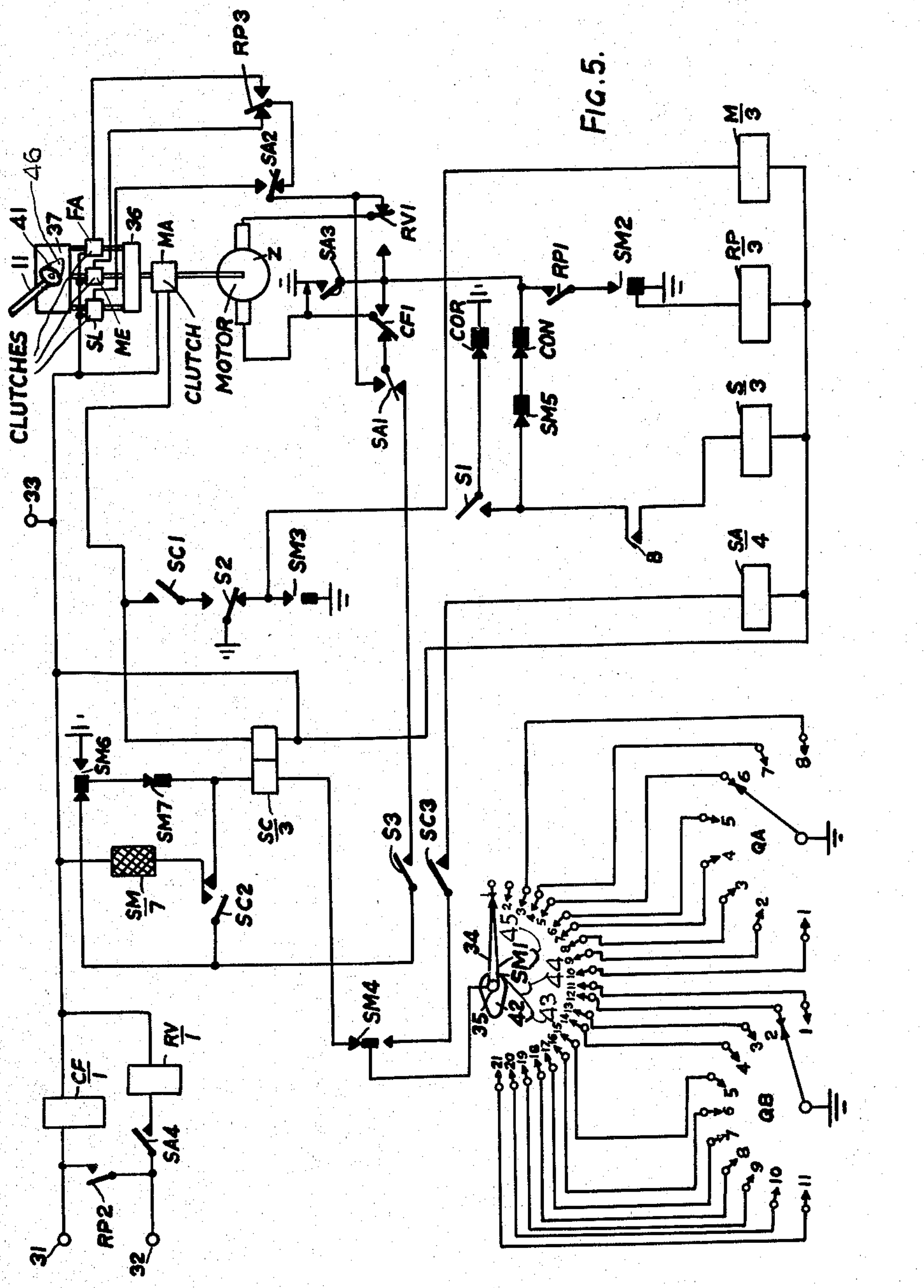

Fig. 5 is a circuit diagram of a second embodiment of the invention and

Figs. 6, 7, and 8 illustrate alternative arrangements of parts of the circuits shown in Fig 4.

Throughout Figs. 1 to 8 like parts have been given like references, and all relays and their associated contacts are shown conventionally. The same conventions are also applied to a uniselector operating coil SM and contacts or banks or contacts associated therewith.

The reference system employs for the various relays and their contacts comprises using one or more capital letters followed by an oblique stroke and a figure for each relay, e. g. A/3. The letter designates the relay and the figure the number of contacts operated thereby. Thus, the relay A/3 would have three contacts. The relay contacts are designated by the same capital letter as that given to the relay and a figure. Thus, in the same example, the three contacts of the relay A/3 would be denoted by A1, A2 and A3.

Referring to Fig. 1, a tunable oscillator 10 is the master oscillator of apparatus required to be tuned to a desired frequency. Tuning of the oscillator 10 is carried out by rotation of a condenser shaft 11 to a desired position by means about to be described.

The output of the oscillator 10, which is of the frequency above referred to as $f$, is fed to a mixer circuit 12 where it is modulated by the harmonics of a harmonic generator 13 of which more details will be given later. Thus there are present in the output of the mixer 12, equally spaced sidebands of the oscillation supplied by the oscillator 10.

These sidebands of $f$ are passed through a filter-amplifier circuit 14 to a second mixer circuit 15 to which is also fed a reference oscillation, of frequency above referred to as $f_0$, generated by a crystal controlled oscillator 16.

Referring now to Fig. 2 (a), $f_0$ is shown to have a value of 21.625 mc./s. and $f$ a value of 25 mc./s. The fundamental frequency of the harmonic generator 13 (Fig. 1) is shown as being 450 kc./s. and those lower sidebands of $f$ which are employed commence at 21.4 mc./s., that is the eighth sideband, and proceed at intervals of 450 kc./s. down to 9.25 mc./s. The reason for suppressing the first seven sidebands is that it is desirable that the amplitudes of the sidebands used should be substantially equal and hence the first seven which have especially large amplitude are suppressed by means of a suitable filter not shown. This state of affairs, as shown in Fig. 2 (a), will be named the "rest" state of the circuit, that is the state existing when the apparatus is first switched on and before a tuning operation is commenced.

As the condenser shaft 11 (Fig. 1) is rotated from the "rest" position (by means to be described later) the frequency $f$ is increased and the raster of harmonics, the sidebands of $f$, also moves up the frequency scale. In doing this each sideband passes in turn, through the reference frequency $f_0$. Fig. 2 (b) shows $f$ at 29.95 mc./s., eleven sidebands of $f$ having passed through the reference frequency $f_0$.

Referring again to Fig. 1, the output of the second mixer 15 is passed through a 0–60 kc./s. filter 17 to two filters 18 and 19. Thus when any sideband of $f$ comes within 60 kc./s. of the reference frequency $f_0$, a beat oscillation is passed through the filter 17 to the filters 18 and 19. Hence, referring to Fig. 2, as $f$ is increased from 25 mc./s. to 29.95 mc./s., eleven such beat oscillations are passed to the filters 18 and 19.

The filter 18 is arranged to pass a band of frequencies from 22–50 kc./s. and the filter 19 a band of frequencies from 0–23 kc./s.

On passing through the filters 18 and 19 the beats are rectified by two rectifiers 20 and 21 whose outputs are fed to a beat counting and condenser driving circuit 22. The function of this circuit 22 is to count the beat oscillations supplied to it, and to rotate the condenser shaft 11 until a predetermined number of beats have been counted, that is to say until $f$ reaches a predetermined value.

In order to facilitate counting, the harmonic generator 13 is arranged to generate two rasters of harmonics. One raster is composed of a series of major harmonics and is shown in Fig. 2. In this case the fundamental frequency is 450 kc./s. as already stated. The second raster is composed of a series of minor harmonics having a fundamental frequency of 90 kc./s.

The operation using the 90 kc./s. raster is the same as has been described for the 450 kc./s. raster. The way in which the counting of the major and minor harmonics is arranged to operate the shaft 11 will be described later.

Referring in detail to the circuit of the harmonic generator 13, power for the generator 13 is supplied by a power unit 23 which is connected to two supply terminals 24 and 25 through a switch 26. Although Fig. 1 shows the power unit 23 supplying power to the generator 13 only, it may, and usually will, supply power to the remainder of the apparatus. The frequency of oscillation of an oscillation valve 27 is determined by the setting of two relay contacts M1 and M2. In the position shown the frequency is arranged to be 450 kc./s., and when the switches M1 and M2 are in their alternative positions it is arranged to be 90 kc./s. The output from the valve 27 is fed through a relay contact M3 to one of two multi-vibrators 28 and 29. The relay contacts M1, M2 and M3 are actuated simultaneously by a relay to be described later and hence when the valve 27 is oscillating at 450 kc./s. the relay contact M3 is in the position shown and the 450 kc./s. oscillation is fed to the multi-vibrator 29. When the relay contacts M1, M2 and M3 are switched to their alternative positions the 90 kc./s. oscillation is generated and fed to the multi-vibrator 28. The multi-vibrators 28 and 29 serve to generate a large number of harmonics from the oscillations supplied to them.

If it is desired to rotate the condenser shaft 11 to a position corresponding to a count of, say, 17 minor, or 90 kc./s., steps from the "rest" state shown in Fig. 2 (a), the relay contacts M1, M2 and M3 are set to the 450 kc./s. position for a count of two, making a total count equivalent to seventeen ninety kc./s. steps.

In the foregoing description the output of the harmonic generator 13 was used to modulate $f$ and the raster of harmonics produced as sidebands of $f$ moved in step with $f$ and produced beats, or coincidences, with a reference frequency $f_0$. These beats may be produced by modulating $f_0$ with the harmonics generated by the generator 13 and then mixing the resulting stationary raster with $f$.

Fig. 3 shows the rearrangement of Fig. 1 necessary to effect this alternative method of producing the beats. In Figs. 1 and 3 like parts have been given like references, and it will be seen that the reference oscillation of frequency $f_0$ produced by the oscillator 16 is modulated by the output of the harmonic generator 13.

The resulting stationary raster is mixed with $f$ in the mixer 15 and the beats produced when $f$ is varied are used as already described with reference to Figs. 1 and 2.

Referring to Fig. 4 and the description with reference to Figs. 1, 2 and 3, on switching on the apparatus (which may be effected by the switch 26 Fig. 1) a relay M (Fig. 4) is operated by current flowing from a positive terminal 33 through the coil of the relay M and a relay contact D2 to earth. The relay contacts M1, M2 and M3 (Fig. 1) therefore, move to the alternative positions to those shown and the apparatus is set to generate a 90 kc./s. raster.

When the valve 27, multi-vibrator 28 and oscillator 10 are functioning adequately the 90 kc./s. raster is produced.

The sideband frequency of this raster nearest to $f_0$ cannot differ therefrom by more than 45 kc./s. and will almost certainly be nearer. As the two filter output terminals 31 and 32 are connected in parallel to a relay CF by D3 the beat frequency between the raster and $f_0$ operates relay CF, this indicating that the oscillator, valve 27, multi-vibrator 28 and at least one of the rectifiers 20 and 21 are working and that the beating oscillations have reached a predetermined amplitude sufficient to operate the relay CF. Only after this has been tested can the apparatus operate.

The relay contact CF1 moves to its operated position and a delay relay D is energised by current flowing from the terminal 33 through D, relay contacts D1, CF1 and SA3 to earth. The relay D locks at D1 in its operated position in which it remains until the apparatus is switched off.

The relay contact D2 de-energises the relay M and contacts M1, M2 and M3 cause the 450 kc./s. raster to be produced. The relay contact D3 disconnects the output of the filter 18 from the relay CF and hence the apparatus is set to commence a tuning operation about to be described. As the minor harmonics are now switched off and contacts D3 are open, relay CF releases before counting commences.

QA and QB are major and minor harmonic setting switches respectively, and as in the previously quoted example, if a count of 32 minor harmonics is required, QA is set to contact 6 and QB is set to contact 2 as shown. To avoid confusion of these contact numbers with references they will hereinafter be referred to as QA/6 and QB/2 respectively and other contacts will be referred to correspondingly. With the settings referred to an earth is put on to contact SM1/5 of a uniselector switch SM1 and on to contact SM1/12 thereof. The contacts of this switch are indicated by the consecutive numbers 1 to 21.

The arm 34 of SM1 is connected through its spindle 35 to a cam switch SM4 which is operated by a cam 42 on the spindle 35 and is closed only when the arm 34 is on any of contacts SM1/1 to SM1/10.

The relay contact D2 puts an earth through two cam switches CON and SM5 to one side of a "select" switch B. The cam switch CON is operated by a cam 41 on the condenser shaft 11 and is closed only when the circuit is in the "rest" state. SM5 is operated from a cam 43 on the spindle 35 of the uniselector SM1 and is closed only when the arm 34 is on contact SM1/1.

On closing the "select" switch B current flows from the terminal 33 through the operating coil of a relay S, switch B, the cam switches SM5 and CON and relay contact D2 to earth. Hence relay S is energised and is locked in this position by a relay contact S1 which places an earth on the relay S from D2 through a cam switch COR and B. The cam switch COR is operated by a cam 46 on the shaft 11 and opens only if the condenser driven by the shaft 11 is accidentally over-run. A contact S3 operates a relay RP through SM2 and RP2 connects the two filters CF and RV together for major harmonic counting. A relay contact S4 connects an earth through contacts SM7 and SC2 on to the uniselector operating coil SM. The contacts SM7 are of the "make-and-break" type such as are commonly used on electric buzzers or tremblers. The action of the contacts SM7 produces current pulses which cause the uniselector arm 34 to be moved rapidly around the contacts on SM1 until the earthed contact SM1/5 thereon is reached. Current then flows from the terminal 33 through the coil of SM, through the contacts SC2, one coil of a relay SC, contact SM4, and the arm 34 to earth. SC is thus operated; SC2 disconnects SM from the contacts SM7 and connects SM through S5 and a relay contact SA1 to CF1.

Whilst this is happening relay contacts SC1 and S2 complete the circuit of an electrically operated master clutch MA which then couples a condenser-driving motor Z to a gear box 36. The supply circuit to the relay RP is already made from earth on S3 through a relay contact SM2 and the coil RP to the terminal 33 and the relay RP is energised. The relay contact SM2 is cam operated from a cam 44 on the spindle 35 and opens only when the arm 34 on SM1 is on contacts 11 to 21 thereon. At the moment under consideration SM1 is set to contact SM1/5 and SM2 is therefore closed. Contacts RP2 connect the output of the rectifier 20 (Fig. 1) to the relay CF, and relay contact RP3 causes an electrically operated "fast" clutch FA to link the gear box 36 with a second gear box 37. The "fast" clutch FA, when engaged, causes the condenser shaft 11 to be driven at relatively high speed by connecting the motor Z to the shaft 11 through suitable gears in the gear boxes 36 and 37.

As the frequency $f$ is increased by rotation of the shaft 11, successive sidebands of $f$ pass through the reference frequency $f_0$ and each coincidence in turn produces a beat oscillation which is rectified by the rectifiers 20 and 21 and causes CF to be operated. Successive operations of CF cause the uniselector SM1 to be moved step by step until contact 11 on SM1 is reached. After the contact 11 has been reached the relay contacts SM2 and CF1 are both open and relay RP is de-energised. The relay contacts RP3 causes the "fast" clutch FA to be disengaged and a "medium" clutch ME to be engaged. Engagement of this clutch ME causes the speed of shaft 11 to be reduced. The relay contact RP2 opens and the rectified output of the filter 19 (Fig. 1) only is connected to CF. A switch SM3, which is operated by the cam 45 on the spindle 35 and is arranged to close only when the arm 34 is on contacts SM1/11 to SM1/21, closes, and the switch SM4, which is also arranged to operate from the cam 42 on the spindle 35 and only when the arm 34 is on contacts SM1/11 to SM1/21, operates, the relay M is energised and the 90 kc./s. raster is produced. CF is then operated each time $f$ is increased by 90 kc./s. and the arm 34 on SM1 is advanced step by step until contact SM1/12 is reached. The circuit for a relay SA is then made from the earthed contact SM1/12 through SM4 and SC3. SA operates and a relay contact SA1 disconnects the uniselector coil SM from CF1. A relay contact SA2 operates causing the "medium" clutch ME to be disengaged and causing a "slow" clutch SL to be engaged. Operation of the relay contact SA3 causes the earth to be removed from the moving contact of CF1 and to be connected to the junction of CF1 and RV1 as shown. CF1, however, remains in the operated position thereby maintaining an earth on the motor Z which continues to run but the shaft 11 is rotated at slow speed. Contacts SA4 connect the rectified output of the filter 18 (Fig. 1) to a relay RV.

$f$ is increased slowly and the motor Z continues to run until the frequency of the next beat oscillation comes within the overlap between the two filters 18 and 19, when both relays RV and CF operate. Both brushes of the motor Z are connected, by contacts CF1, and RV1, to earth and the motor stops.

The apparatus is then tuned to the required frequency.

From the foregoing description it will be seen that if the switches QA and QB have been set to required positions and the "select" switch B is not made when the apparatus has warmed up after first switching on, the operation of the delay relay D, which occurs immediately the valves concerned with the generation and delivery of the beat oscillations are operating correctly, permits a tuning operation to commence when the "select" switch B is made. Alternatively if the "select" switch B had been made before the apparatus was switched on, the operation of the relay D would permit (initiate or cause), the tuning operation to commence once the apparatus had been switched on and had warmed up.

Referring now to Fig. 5, which shows a modified form of the circuit shown in Fig. 4 the delay relay D is omitted and its functions are taken over by the relay S. In this case, on switching on the apparatus and when the oscillators for producing to 90 kc./s. raster are working, CF operates and the relay S operates at once if the select switch B is closed, or, if B is not closed, then S operates as son as B is closed, and the apparatus is tuned substantially as previously described. The effects of the slight differences between the two figures will be understood by those skilled in the art. If the "select" switch B is then opened S is de-energised and the circuit returns to the rest state. Hence with this arrangement a test for the presence of beat oscillations is made every time a tuning process is initiated instead of only when the apparatus is first switched on, and a tuning process is initiated or permitted only when such test indicates that beats are present.

Instead of the operation of the relay contacts SC1 and S2 causing the master clutch MA to be operated, they may be arranged to switch on the motor Z as shown in Fig. 6.

Furthermore the shaft 11 may be driven manually in which case the master clutch MA may be connected as shown in Fig. 7 thereby preventing an operator from turning the shaft 11 until beat oscillations are being produced.

Referring to Fig. 8 rotation of the shaft 11 may be prevented by an armature 38, of an electromagnet 39, bearing against a stop 40 on the shaft 11. The armature 38, in this case, is withdrawn clear of the stop 40 only when the contacts SC1 and S2 are closed, that is to say, when beat oscillations are being produced.

It will be seen that the present invention provides means which ensure that tuning does not commence until the valves generating all the oscillations which combine and produce the 90 kc./s. raster and associated beats are in proper operation and moreover that the delay introduced is substantially as small as possible.

We claim:

1. Multi-channel radio signalling apparatus comprising means for generating a first oscillation, means for generating a plurality of oscillations of equally-spaced frequencies, tuning means for varying the relative values of the frequencies of said first oscillation and said plurality of oscillations, control means for operating said tuning means, responsive means for preventing the operation of said tuning means by said control means but responsive to oscillations applied thereto exceeding a predetermined amplitude to permit said operation, means for beating together said first oscillation and said plurality of oscillations to produce beating oscillations, and means for applying said beating oscillations to said responsive means only.

2. Multi-channel radio signalling apparatus comprising means for generating a first oscillation, means for generating a plurality of oscillations of equally-spaced frequencies, tuning means for varying the relative values of the frequencies of said first oscillation and said plurality of oscillations, control means for operating said tuning means, a clutch device which when operative couples said control means to said tuning means and when inoperative permits relative movement of said control means and said tuning means, means for beating together said first oscillation and said plurality of oscillations to produce beating oscillations, and means for applying said beating oscillations to said clutch device to render said clutch device operative only when said beating oscillations exceed a predetermined amplitude.

3. Multi-channel radio signalling apparatus as claimed in claim 2, wherein said clutch device comprises an electromagnetically operated clutch, a current source for operating said clutch, and a relay for controlling the supply of current from said source to said clutch, the operating winding of said relay being fed with said beating oscillations and being actuated to render said clutch operative when the amplitude of said beating oscillations exceed said predetermined amplitude.

4. Multi-channel radio signalling apparatus comprising means for generating a first oscillation, means for generating a plurality of oscillations of equally-spaced frequencies, tuning means for varying the relative values of the frequencies of said first oscillation and said plurality of oscillations, control means for operating said tuning means, a fixed element, fixed relatively to said tuning means, a stop device comprising a movable element which, when said device is inoperative, can engage said fixed element to prevent operation of tuning means by said control means, means responsive to oscillations applied thereto exceeding a predetermined amplitude to displace said moving element out of engagement with said fixed element to permit said tuning element to be operated, means for beating together said first oscillation and said plurality of oscillation to produce beating oscillations, and means for applying said beating oscillations to said responsive means.

5. Multi-channel radio signalling apparatus comprising means for generating a first oscillation, means for generating a plurality of oscillations of equally-spaced frequencies, tuning means for varying the relative values of the frequencies of said first oscillation and said plurality of oscillations, an electric motor for operating said tuning means, a current source for operating said motor, a relay device which when operative connects said source to said motor, means for beating together said first oscillation and said plurality of oscillations to produce beating oscillations, and means for applying said beating oscillations to an operating winding of said relay device to render said relay device operative only when said beating oscillations exceed a predetermined amplitude.

6. Multi-channel radio signalling apparatus comprising means for generating a first oscillation, means for generating a plurality of oscillations of equally-spaced frequencies, tuning means for varying the relative values of the frequencies of said first oscillation and said plurality of oscillations, driving means for operating said tuning means, switch means which when actuated initiate the operation of said tuning means by said driving means, protective means for preventing the operation of said tuning means by said driving means, even when said switch means are actuated, but responsive to oscillations applied thereto exceeding a predetermined amplitude to permit said operation, means for beating together said first oscillation and said plurality of oscillations to produce beating oscillations, and means for applying said beating oscillations to said protective means.

7. Multi-channel radio-signalling apparatus according to claim 6, wherein said protective means comprise a first relay having said beating oscillations applied to the winding thereof, and a second relay having its winding in circuit with said switch means and contacts of said first relay and adapted to be actuated upon actuation of said first relay when said switch means are actuated, said second relay being connected to control the operation of said tuning means by said driving means.

ERIC PLAYFAIR FAIRBAIRN.
ALEXANDER ALBERT CHUBB.

REFERENCES CITED

The following references are of record in the file of this patent:

UNITED STATES PATENTS

| Number | Name | Date |
|---|---|---|
| 2,304,871 | Andrews | Dec. 15, 1942 |